Aug. 6, 1929.                M. C. OVERMAN                1,723,435
                              CUSHION TIRE
                         Original Filed June 17, 1922

Inventor
Max Cyrus Overman
By his Attorney

Patented Aug. 6, 1929.

1,723,435

UNITED STATES PATENT OFFICE.

MAX CYRUS OVERMAN, OF NEW YORK, N. Y., ASSIGNOR TO OVERMAN CUSHION TIRE COMPANY INC., A CORPORATION OF NEW YORK.

CUSHION TIRE.

Application filed June 17, 1922. Serial No. 569,044.

My present invention relates to improvements in tires having separate longitudinally extending base-sections with separate metallic base-bands vulcanized thereto, whereby I mold said tire with its base-sections and metallic bands laterally separated so that when the tire is forced on to the wheel rim with said bands in lateral contact, advantageous stresses are set up in the walls of the tire causing them to tend inwardly toward each other. On this account, said walls mutually support or brace one another so that when the tire is in action they all the more effectively do their work of standing up under and supporting the load, absorbing the shocks and withstanding the lateral strains without outward bending collapse.

A further object of my improvements is to provide means for securing said base-sections and bands in lateral contact prior to forcing them on the wheel-rim, said means including one or more tension members; also more broadly to provide improved means for fastening together the metal base-bands of any vulcanized-on tire.

More broadly stated, my invention comprises a cavity-enclosing metal-base tire whose base-bands connected by the rubber tire-body are displaced inwardly towards each other to set up stresses in the cavity-separated tire-walls sufficient to bend said walls convexly on their cavity-bordering surfaces, thereby directing said walls inwardly towards the cavity, when the tire is under load.

Figure 1:
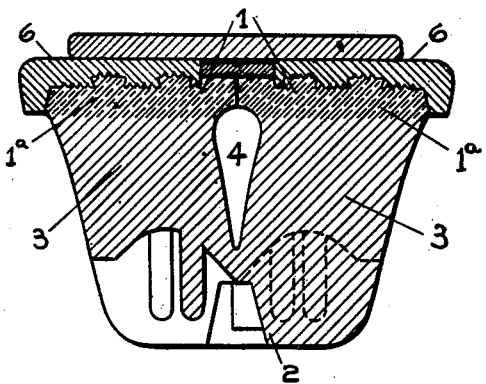
Figure 2:
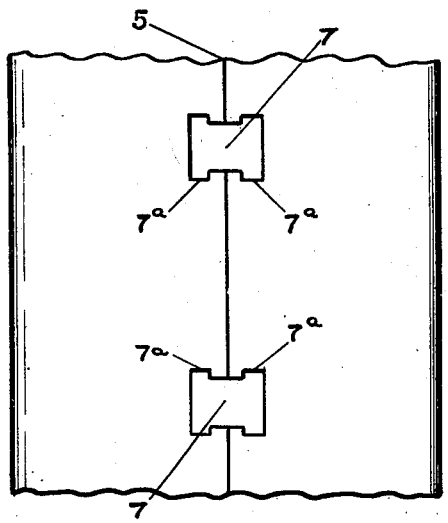
Figure 3:
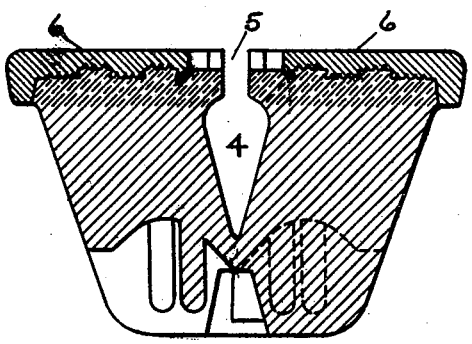

In the accompanying drawings, Fig. 1 is a transverse sectional view of a tire within my invention which embodies my improvements in their preferred form, the tire being shown in operative position on the metallic rim of a vehicle wheel; Fig. 2 is a top plan view of a fragment of the metallic base-bands as seen from above in Fig. 1 with the vehicle wheel rim omitted; and Fig. 3 is the same as Fig. 1 except that the tire is shown unmounted on the wheel rim and with its walls and base-sections and bands spread apart just as the tire comes from the mold.

The expressions of direction such as "top" and "bottom" and the like in the following description and claims refer to the tire positioned as in Fig. 1 with its tread downwards.

The tire is, of course, made of rubber compound or equivalent tire material.

Describing now the aforesaid preferred embodiment of my invention, 1 is the base portion of the tire integrally united to the tread portion 2 by the walls 3, which latter contain between them the cavity 4 which lies outside of the base-bands and extends longitudinally and preferably continuously around and through the tire, without reducing the area of the vulcanized union between the rubber base and the metallic base-bands.

The aforesaid base portion of the tire consists of separate longitudinally extending base-sections 1ª—1ª divided from each other at 5 over the cavity 4.

6—6 are separate metallic base-bands or rings corresponding to the several base-sections 1ª—1ª of the tire, the former being vulcanized to the latter when the tire is molded.

The tire is designed so that when it comes from the mold, its aforesaid metallic-band shod base-sections 1ª and 1ª are spaced apart laterally as shown in Fig. 3. This space is closed up as shown in Figs. 1 and 2 when the tire is in use on a wheel, the pressing of the two rigid, parallel metal bands together on said wheel producing compressive stress in the upper part of the tread portion at the apex of the cavity 4 and bending stresses in the walls 3—3, making them convex, or tending to be convex for the greater portion of their radial length toward the cavity 4, the reactions of the walls one against the other where they join below the cavity 4 causing them to brace and mutually support each other all the more effectually and to increase the lateral stability of the tire under the various conditions of service and use.

The tire is otherwise of the preferred Overman construction comprising steeply convergent load-supporting substantially straight walls separated by a V-shaped space and united by a tread portion which has a wide ground contact under said walls, whose mode of operation, briefly stated, is that the walls are thereby made to stand upright under the load and tread thrusts and are caused to do their work with vertical compression and transverse thickening with laterally inward tendency towards each other and without outward bending collapse thereof.

In the tire of my present improvements, the initial tendency of its walls to bend convexly on their cavity-bordering surfaces serves all the more surely to direct said walls inwardly towards the cavity when the tire is under load, which action, as explained, is so desirable.

Preferably, the means shown is used for tying together the aforesaid parts of the tire, etc., in the condition shown in Figs. 1 and 2, said means consisting of one or more tension members 7 each fitting down into two adjoining recesses in the adjacent metallic bands 6—6, the two recesses together having the outline or shape of the member 7 including its enlarged ends 7ª—7ª, said member thereby effectually tying the bands together in lateral contact and preventing said bands and walls 3—3 from springing apart (as in Fig. 3) before the tire is forced on the wheel-rim. Preferably the aforesaid recesses for receiving the members 7 consist, as best shown in Figs. 1 and 2, of openings extending vertically clear through the metallic bands 6 with the bottom of said recesses consisting of the tire-sections vulcanized as aforesaid to said metallic bands.

The means shown, or its equivalent, may be used also for fastening together the metal base-bands of any vulcanized-on tire including the base-bands of such a tire of the pressed-on type, and said means may comprise any suitable or preferred form of laterally shouldered recesses in the adjacent portions of the base-bands, said recesses being open to the inner periphery of said bands and their shoulders being adapted to be engaged by corresponding lateral projections (for instance, such as 7ª) on a member which is insertable radially into said recesses and serves to fasten the base-bands together, said member or members lying entirely outside of the inner periphery of the base-bands so as not to obstruct or interfere with the pressing of said base-bands onto the wheel.

In order not to unduly weaken the vulcanized union between the tire and the metallic base-bands, it will be noted that I prefer to limit the size of the recesses of the members 7 including their size transversely relative to the base of the tire, so as to lie within the angle included between the inner faces of the tire walls 3 as best shown in Figs. 1 or 3.

Thus, it will be seen from the foregoing that I conveniently mold a cushion tire onto plural base-bands of the usual pressed-on type with sufficient space between the bands for the core, for forming the cavity of the tire, to be readily removed, and that through such molding in extended position, I am able to set up advantageous stresses in the tire by forcing said base-bands together.

Also, I have provided means for effectually fastening together the base-bands of said tire or of any other plural base-band vulcanized-on tire, so that no disadvantage has been incurred as regards the satisfactory operation of the tire either when it is forcibly pressed in the usual manner onto a vehicle wheel, or when it is applied thereto by means of a demountable rim of any usual or preferred form.

It is possible that changes and modifications may be made in the illustrative embodiment of my improvements which will nevertheless still be within the scope and spirit of my invention and within the scope and spirit of the annexed claims, and as such are intended to be covered thereby; also certain features may be used without others.

What I claim is:

1. In a cushion tire, a pair of annular metallic base bands; an annular tire-body of rubber-like material having annular base sections permanently united to said base bands, said body also having a pair of inclined side walls separated by a V-shaped cavity and permanently united to the respective tire base sections and mutually converged radially outward into an integral tread portion having a wide ground contact delivering the tread thrusts well under said walls, said base bands connected by said rubber tire-body being displaced inwardly towards each other sufficiently to give said walls the tendency to bend convexly on their cavity-bordering surfaces; and means retaining said base-bands in their said inwardly displaced position.

2. In a cushion tire, a pair of metallic base bands; a tire-body of rubber-like material having a pair of inclined cavity separated side walls permanently united to the respective base-bands and mutually converged radially outward into an integral tread portion having a tread surface with an initially wide ground contact, said base-bands being displaced inwardly towards each other sufficiently to give said walls the tendency to bend convexly on their cavity-bordering surfaces; and means retaining said base-bands in their inwardly displaced position.

3. In a cushion tire of the pressed-on vulcanized to metal base-band type comprising separate metallic base-bands, longitudinally extending tire base-sections corresponding to said metallic base-bands vulcanized thereto, laterally spaced load-supporting walls converging from said tire base-sections into a tread portion connecting the lower portion of said walls, said metallic base-bands being provided with recesses open to their inner periphery, which recesses are provided with shoulders, said recesses lying within the angle included between the inner faces of said load-supporting walls, the bottom of said recesses consisting of the tire base-sections vulcanized as aforesaid to the metallic base-bands; and a member provided with projections which engage the said shoulders in said recesses and fasten the tire bands together.

4. In a cushion tire the combination of a hollow rubber annular body having its hollow open to the interior periphery thereof; a plurality of adjacent parallel annular metallic base-bands on the outer periphery of which the rubber body of the tire is integrally secured against movement with respect thereto by vulcanization without closing the aforesaid interior peripheral opening of said hollow tire body; said base-bands being provided with laterally and radially open recesses formed in their adjacent edges; and tying members coacting with the said recesses to tie the said base-bands together, radially outward movement of the said tying members in the said recesses being limited by the overlying rubber body integrally secured to the said bands.

5. A cushion tire structure, comprising a tire body of rubber composition having a pair of inclined side walls united at their outer ends in a tread portion having a wide ground contact surface and molded with their inner ends spaced apart, a pair of metallic base-bands permanently united to the inner ends of said side walls respectively, and tension tying members connecting said base-bands and displacing the inner ends of said walls inwardly towards each other.

6. A cushion tire structure, comprising a tire body of rubber composition having a pair of side walls united at their outer ends in a tread portion and molded with their inner ends spaced apart, a pair of metallic base-bands permanently united to the inner ends of said side walls respectively, and tension tying members connecting said base-bands and displacing the inner ends of said walls inwardly towards each other.

Signed at New York in the county of New York and State of New York this 16th day of June A. D. 1922.

MAX CYRUS OVERMAN.